United States Patent [19]
Lawson et al.

[11] Patent Number: 5,736,719
[45] Date of Patent: Apr. 7, 1998

[54] METHOD AND APPARATUS FOR HEAT SEALING OF PACKAGING MATERIALS EMPLOYING RF ELECTRIC ENERGY

[75] Inventors: Douglas K. Lawson, Chapel Hill, N.C.; Charles J. Kimmel, West Chester, Ohio

[73] Assignee: International Paper Company, Purchase, N.Y.

[21] Appl. No.: 705,185

[22] Filed: Aug. 29, 1996

[51] Int. Cl.⁶ .................. H05B 6/54; B23K 13/00
[52] U.S. Cl. .................. 219/769; 219/777; 219/780; 156/274.4; 156/380.4; 156/380.6
[58] Field of Search .................. 219/769, 765, 219/780, 777; 156/274.4, 274.6, 380.3, 380.4, 380.5, 380.6, 380.7, 380.8

[56] References Cited

U.S. PATENT DOCUMENTS

| | | | |
|---|---|---|---|
| 2,492,347 | 12/1949 | Ashley | 12/55 |
| 2,565,161 | 8/1951 | Wilmotte et al. | 219/765 |
| 2,691,613 | 10/1954 | Baer | 154/116 |
| 2,751,965 | 6/1956 | Miller | 154/42 |
| 2,785,729 | 3/1957 | Smith et al. | 154/42 |
| 3,274,370 | 9/1966 | Klaus | 219/10.53 |
| 3,403,064 | 9/1968 | Bellamy | 156/273 |
| 3,632,943 | 1/1972 | Engler et al. | 219/10.79 |
| 3,671,709 | 6/1972 | Gidge | 219/10.53 |
| 3,725,189 | 4/1973 | Gidge | 156/274.4 |
| 3,738,892 | 6/1973 | Curcio | 156/380 |
| 4,135,957 | 1/1979 | Voller | 156/157 |
| 4,268,338 | 5/1981 | Peterson | 156/251 |
| 4,539,793 | 9/1985 | Malek | 53/469 |
| 5,093,546 | 3/1992 | Matsumiya et al. | 219/10.41 |
| 5,345,070 | 9/1994 | Hlavinka et al. | 219/769 |

FOREIGN PATENT DOCUMENTS 1 479 821   10/1970   Germany.

*Primary Examiner*—Philip H. Leung
*Attorney, Agent, or Firm*—Paul E. Hodges, P.C.

[57] ABSTRACT

Method and apparatus employing radio frequency electric energy for heat sealing of laminated packaging materials, particularly aseptic packaging materials, that include facing contiguous layers of thermoplastic material, including first and second seal jaws having respective working surfaces. The working surface of the first seal jaw is defined by a plurality of working faces of alternating layers of electrically conductive and electrically nonconductive materials. Upon the application of RF energy across the electrically conductive layers of the first seal jaw, selective melting of the layers of thermoplastic material occurs, whereupon the contact pressure exerted by the seal jaws upon the layers of packaging material is assumed by the volume of nonmolten thermoplastic material disposed between the faces of the electrically nonconductive layers of the first seal jaw and the working surface of the second seal jaw, thereby causing the seal jaws to move toward each other by a limited amount by reason of deformation of the packaging material. A seal of consistent and good uniformity is formed.

11 Claims, 2 Drawing Sheets

METHOD AND APPARATUS FOR HEAT SEALING OF PACKAGING MATERIALS EMPLOYING RF ELECTRIC ENERGY

FIELD OF INVENTION

This invention relates to the sealing of polymeric surfaces to one another, and particularly to methods and apparatus for the heat sealing of aseptic packaging materials.

BACKGROUND OF INVENTION

Many consumable products such as juices, milk, detergents, etc. are currently packaged in disposable containers, commonly comprising paperboard laminated with at least one outer layer of a heat sealable polymer. This outer layer is designed to be in contact with the packaged product. The packaging operation commonly used involves a form, fill and seal (FFS) machine. FFS machines are designed to operate continuously and often at relatively high rates of production, the packaging being formed at least semi-continuously from a web of packaging material. Also commonly, the closing of the formed and filled package (also referred to at times as a "container") is effected by heat sealing (also referred to at times as "welding") of facing polymeric layers of the laminated packaging material. Many food products are packaged asceptically.

The successful formation of sealed, aseptic, web fed packages is dependent upon the production of polymer to polymer seals (welds) of overlying contiguous layers of multi-layered packaging material. In traditional induction sealing, the product surfaces to be sealed to one another are brought into contact with one another under pressure and held in place between an electrically-active seal jaw and an elastomeric back-up seal jaw. A low frequency, alternating magnetic field is then applied to the one electrically-active seal jaw creating eddy currents and localized heating in a metallic or other electrically conductive layer of the packaging material. The localized heating and pressure allows the contacting polymer layers to melt together and form a weld upon cooling. For a given thickness of polymer coating, the quality of the weld produced will be a function of the contact pressure, heating time, and the time allowed for the molten polymers to solidify after melting.

The conventional induction sealing process is hampered by the time required to establish a weld and the cost of imbedding a metallic layer in the packaging material. The metallic layer also hampers recycling of the packaging material.

Radio frequency (RF) sealing of the packaging material has been proposed. In RF sealing, a specific polymer layer in the packaging material replaces the metallic layer. The polymer chosen comprises polar molecules which oscillate or rotate in their matrix when the material is subjected to a high frequency, alternating electric field. The resulting molecular friction results in heating of the polymer with ultimate heating of contiguous overlying layers of thermoplastic material to their melting point.

The continuous operation of web-fed FFS machines allows only a short time period to produce polymer welds of the packaging material. For the welds to be of acceptable quality the contact pressure, heating and cooling times must all be carefully controlled. Weld pressure and time are dictated by the mechanical set up of the FFS machine. Control of the weld pressure is adjustable but difficult to establish and maintain. Excessive weld pressure forces molten polymers out of the weld zone producing a thin and weak weld. Minimal weld pressure does not encourage the molten polymers to bond together resulting in weak and discontinuous welds. Uncontrolled change in the actual pressure experienced by the overlying contiguous polymeric layers can force molten material out of the desired weld area.

Further, currently designed seal jaws for the application of RF electric energy in the generation of a seal for a packaging material are plagued with the problem of jaw to jaw arcing through or around the packaging material or in those areas of the jaws which extend beyond the boundaries of the packaging material disposal between the jaws.

Therefore, it is an object of the present invention to provide a method and apparatus for the heat sealing of polymeric layers of a packaging material employing RF electric energy. Other objects and advantages of the invention will be recognized from the description contained herein, including the claims and drawings in which:

SUMMARY OF INVENTION

Figure 1:
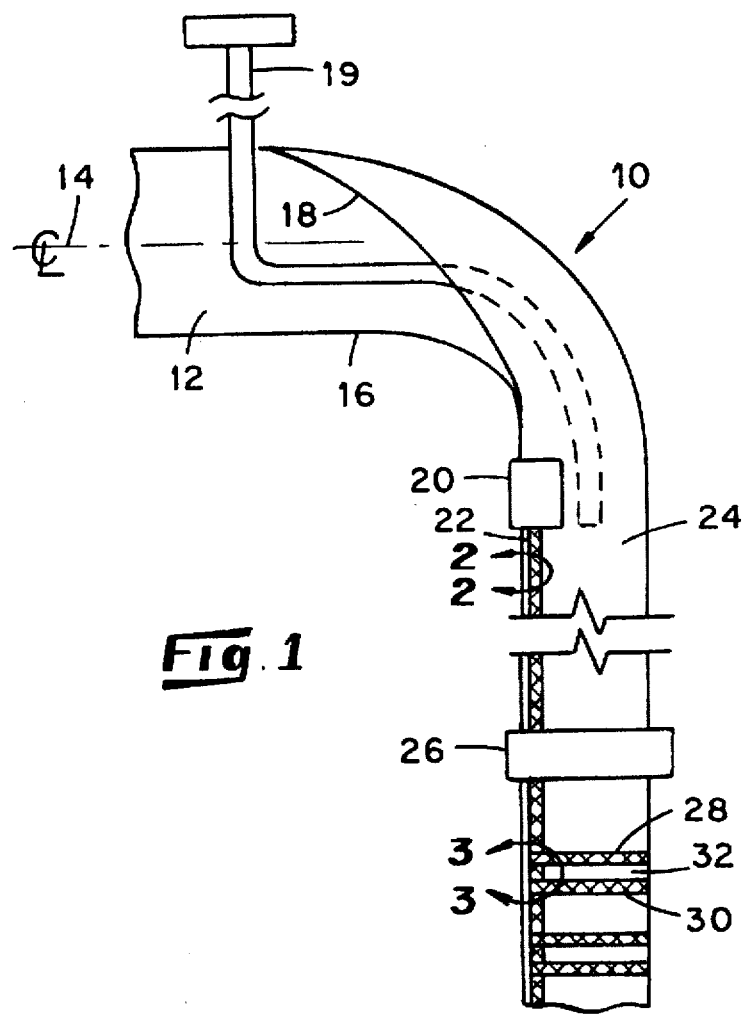
FIG. 1 is a schematic representation of one embodiment of a FFS machine for forming a web of packaging material into product-filled individual packages.

In accordance with one aspect of the present invention there is provided a seal jaw assembly comprising first and second seal jaws, at least the first one of which includes a plurality of alternating electrically conductive and electrically nonconducting components, e.g. planar layers, each having an individual working face. These faces collectively define a working surface of the first seal jaw, which working surface is presented to one surface of overlying layers of packaging material disposed between the first and second seal jaws for sealing purposes. Each such layer of packaging material includes a layer of thermoplastic material. For sealing purposes, the layers of thermoplastic materials are disposed in facing contiguous relationship one to another. The individual faces of the plurality of layers of the first seal jaw retain their unique individual function when combined to collectively define the working surface of the first seal jaw. Only one of the two seal jaws needs to be so layered, the second seal jaw serving as an electrically-conductive rigid backup or anvil in the sealing operation and is presented to an opposite one of the surfaces of the overlying layers of packaging material.

In the present invention, the first seal jaw includes at least one electrically conductive layer which is flanked on its opposite sides by electrically nonconductive layers. Further, in accordance with another aspect of the present invention, the flanking nonconductive layers comprise the outside edges of the first seal jaw.

As noted, each layer of the first seal jaw includes a face that is disposed in facing relationship to the overlying layers of packaging material in that area of the packaging materials which is to be sealed. The working face of each of the electrically conductive layers is active in that RF electric energy applied across the seal jaw assembly functions to generate sufficient heating of the facing thermoplastic layers of the packaging material to effect melting of the thermoplastic layers in the areas thereof between the working faces of the electrically conductive layers of the first seal jaw and the facing working surface of the second jaw. The electrically nonconductive layers interposed between the electrically conductive layers of the first seal jaw are nonactive with respect to the conduction of RF electric energy between the seal jaws in the region immediate to each of these nonactive layers, hence there is no substantial melting of the polymeric layers in the region between the working faces of these nonconductive layers and the surface of the second seal jaw. However, it has been found by the present inventors that these nonactive layers provide a valuable aspect to the present invention. That is, it has been discovered that when the working surfaces of the seal jaws are brought into contact with the overlying layers of packaging material disposed between the jaws, the contact force, ie., pressure, applied initially to the layers of packaging material is distributed between the active and the nonactive layers. The application of RF electric energy causes localized heating in the laminated packaging material disposed between the working faces of the active (conductive) layers of the first seal jaw and the opposed working surface of the second seal jaw, raising the temperature of the contiguous polymer layers to their melting point. As the polymer melts, it is no longer capable of resisting advancement of the seal jaws toward one another by reason of the contact force applied to the opposing seal jaws. This contact force thus becomes supported only by those portions of the packaging material which are disposed between the working faces of the nonactive (nonconductive) layers of the first jaw and the opposing working surface of the second seal jaw and where there is no substantial melting of the polymer layers. This effect increases the contact pressure per unit of area exerted by the seal jaws upon the packaging material disposed therebetween only in those areas of the packaging materials which are disposed between the working faces of nonactive jaw layers and the working surface of the second jaw. This increased pressure per unit of area of the packaging materials causes the opposing seal jaws to move slightly closer to one another as the packaging material deforms under the load. This action forces the molten polymer layers together to uniformly spread the molten polymer throughout the desired weld area between each of the working faces of each of the active conductive layers and the working surface of the second seal jaw. The extent of this further movement of the seal jaws toward one another as the polymer melts is not without limits, however. More specifically, there is no increase in the maximum force on the overall working surface of a seal jaw upon melting of the polymer, but rather the initially applied pressure (force per unit area) becomes distributed over a lesser area, namely over the collective areas of the faces of the nonconducting layers of the first seal jaw. This results in further deformation of the non-molten packaging materials to a maximum deformation whereupon the movement of the seal jaws toward one another is halted. This further movement of the seal jaws toward one another upon the melting of the polymer serves to cause the molten polymer to flow within the areas thereof which are disposed between the faces of the conductive layers of the first seal jaw and the working surface of the second seal jaw, thereby developing a uniform dispersion of the molten polymer and the development of a uniform and continuous seal between the polymer layers upon cooling of the polymer and subsequent release of the contact pressure.

Accordingly, the present invention provides for the calculation of an acceptable initial contact pressure which need not be monitored nor modified over the time duration of the sealing operation. But rather, the present invention provides for the initially applied pressure to be converted into desirable varying effects over the course of forming the seal, and in a self-limiting manner. Deleterious thinning of the polymeric layers in the seal area is thereby prevented. This advantage notably is obtained substantially irrespective of the thickness of the packaging material being sealed.

In accordance with a further aspect of the present invention, nonactive layers are provided at the outermost limits of the layered seal jaw. That is, the outboard layers of the first seal jaw are nonactive layers. In this manner, the molten polymer is prevented from exiting the weld zone by non-molten polymer that is sandwiched between the working faces of the outer nonactive layers of the first seal jaw and the working surface of the second seal jaw.

Further, the nonactive layers serve to force any contaminates (i.e., product) out of the interface between the contiguous layers of polymeric material so that these contaminates are not present in the completed seal where they could adversely affect the quality of the seal. Still further, when sealing overlapping side edges of a packaging material in the course of forming the web of packaging material into a continuous tube or the like prior to filling (often termed a longitudinal seal) the outermost nonactive layers of the first seal jaw serve to support the raw edge of the outer layer of the packaging material and ensure full sealing of the overlapped or overlying side edges to one another.

Further, the presence of the electrically nonconductive layers at the outermost edge limits of the first seal aid in reducing the likelihood of arcing of the RF electric energy between the first and second jaws, particularly in those areas of the facing jaws that may extend beyond the packaging materials that are held between the jaws. This avoidance of arcing is further aided by the elimination of contaminates from the seal area as noted herein. Additional aid in reducing arcing can be obtained through the use of impingement jets directed substantially parallel to the seal area prior to sealing, to blow away contaminates and/or moisture from the intended seal area.

The cross-sectional profile of the seal jaws is determined with regard to filling machine dependent space constraints and desired weld profile. The lengths of the cooperating seal jaws are chosen to be at least equal, and preferably to exceed by a relatively small amount, the width of the packaging material when making transverse seals of the packaging material to thereby provide support for the edges of the packaging material, to ensure sealing fully across the transverse dimension of the packaging material, and to aid in excluding product being packaged from the seal area, as noted.

DETAILED DESCRIPTION OF INVENTION

With reference to FIG. 1, there is depicted a form, fill, seal machine 10 in which a web 12 is folded along its centerline 14 so that its opposite side edges 16 and 18 overlie one another. These overlying side edges are sealed to one another by means of a first seal jaw assembly 20 in accordance with the present invention, to form a longitudinal seal 22 along these overlying side edges and thereby cause the web to assume a tubular configuration. A product feed tube 19 introduces product, for example juice, into the tube 24.

Figure 2:
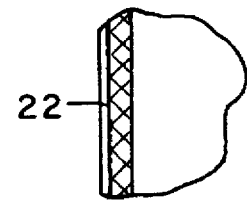
FIG. 2 is a cutaway view of a web of packaging material which has been formed into a tube by folding the web onto itself and heat sealing the overlying side edges of the web and depicting the longitudinal seal of these side edges.
Figure 3:
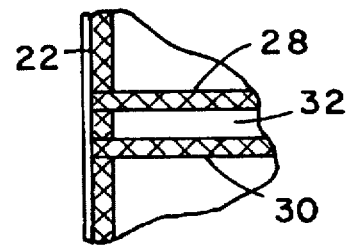
FIG. 3 is a cutaway view of the tube of FIG. 2 and depicting one embodiment of a seal extending transversely across the tube.

Thereafter, the tube is sealed transversely of the length of the tube as by a second seal jaw assembly 26, also in accordance with the present invention. In the depicted embodiment, the second seal jaw assembly forms two transverse seals 28 and 30 that are substantially parallel to one another, but are spaced apart by an unsealed region 32 therebetween. As best seen in FIGS. 2 and 3, the longitudinal seal extends parallel and up to the outermost limits of the side edges 16 and 18 of the folded web, and the transverse seals extend fully across the width dimension of the tube, including the longitudinal seal. As depicted in FIG. 1, the transverse sealing pattern is repeated at predetermined lengths along the length dimension of the tube. Subsequent to the completion of the transverse seals 28 and 30, the tube is severed transversely within the region 32 between these transverse seals to separate the filled and sealed product packages into individual packages as is well known in the art.

Figure 4:
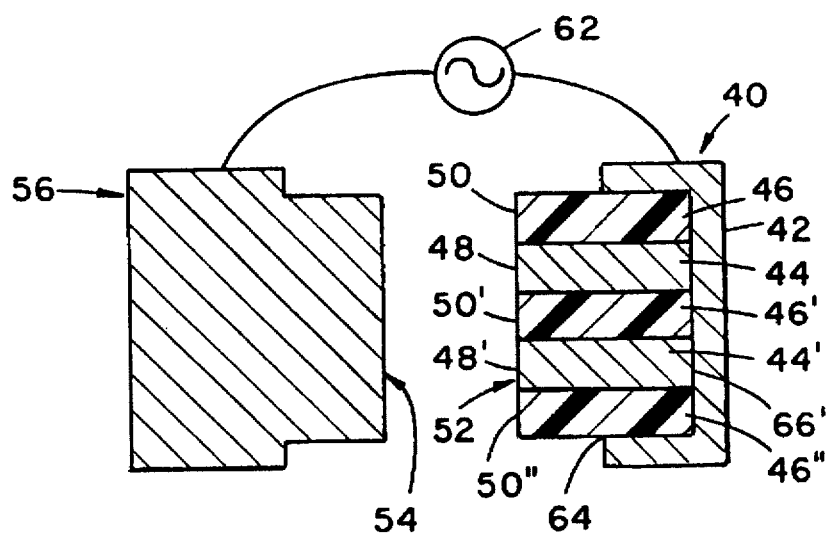
FIG. 4 is a schematic representation of a sealing jaw assembly embodying various of the features of the present invention.
Figure 5:
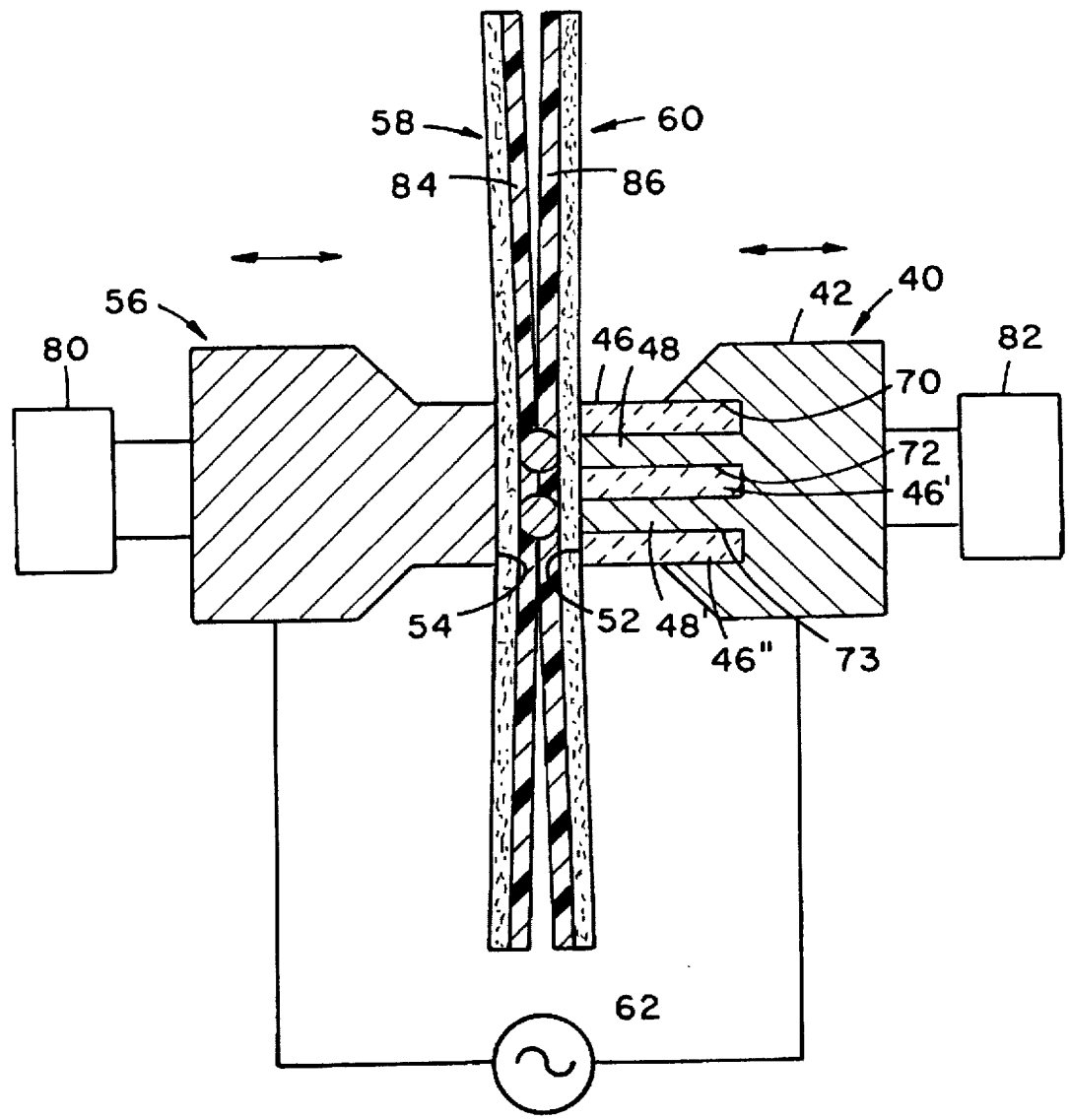
FIG. 5 is a schematic representation of a further embodiment of a seal jaw assembly embodying various of the features of the present invention and depicting layers of laminated packaging material in position for sealing.

With reference to FIG. 4, in one embodiment of the seal jaw assembly of the present invention, there is provided a first seal jaw 40 which includes a housing 42 within which there are mounted alternating electrically conductive and electrically nonconductive layers 44, 44'and 46, 46' 46", respectively. Each of these layers is depicted as having a rectangular cross section and as being planar in geometry which is a preferred embodiment. However, it will be recognized that other geometries and cross sectional profiles may be employed, depending upon the shape of the seal and electrical field which are desired. Each of the layers 44 and 44'includes a working face 48 and 48', respectively. In like manner, each of the layers 46, 46' and 46" includes a working face 50, 50' and 50", respectively. These faces of the several layers collectively define a working surface, indicated generally by the numeral 52, on the first seal jaw 40, which working surface is disposed in facing relationship to a working surface 54 provided on an electrically conductive second seal jaw 56. As shown in FIG. 5, these facing working surfaces 52 and 54 receive therebetween overlying layers 58 and 60 of packaging material for the sealing of the layers of packaging material to one another in the region thereof which is generally disposed between the first and second seal jaws. The first and second seal jaws 40 and 56 are connected in an electrical circuit with a source of radio frequency (RF) electric energy 62.

In the embodiment of the seal jaw assembly depicted in FIG. 4, the housing 42 is of an electrically conductive material such as brass, aluminum or the like. In this embodiment, the alternating layers of electrically conductive and electrically nonconductive materials are press-fitted into an opening 64 in the housing with the faces 66 and 66' of the electrically conductive layers 48 and 48', respectively, being in electrical contact with the housing. In the embodiment of the seal jaw assembly depicted in FIG. 5, the electrically conductive layers 48 and 48'are integral with the housing and the electrically nonconductive layers 46, 46' and 46" are fitted and anchored in respective slots 70, 72 and 73 defined in the housing.

preferably, the layers which collectively define the working surface of the first seal jaw are each rigid and incompressible under pressures up to about 300 psi. As noted, the electrically conductive layers may suitably be of a metal or metal alloy, such as brass, aluminum or the like. Also as noted, the electrically conductive layers may be formed integrally with the housing 42 or may comprise separate components that are mounted by, and in electrical communication with, the housing. The electrically nonconductive layers preferably have a high dielectric strength and are readily machinable, in addition to their rigidity. Suitable materials for these electrically nonconductive layers include polytetrafluoroethylene (PTFE), ultra high molecular weight (UHMW) polyethylene, KYNAR PVDF, and VESPEL polyimid. The dimensions of the working face of each electrically conductive layer of the first seal jaw is dependent upon the dimensions of the desired seal area. In the depicted longitudinal and transverse seals, the width of each of these seals is approximately 0.080 inch, having been produced employing an electrically conductive layer having a working face of between about 0.36 and about 0.48 inch width. As depicted, in one embodiment, the longitudinal seal is continuous and the transverse seals extend only across the width dimension of the tube. The separation distance between adjacent electrically conductive layers, as established by the width dimension of an electrically nonconductive layer, is a function of many factors, but the resultant requirement is that the collective areas of the working faces of the electrically nonconductive layers be adequate to assume the full contact pressure upon melting of the polymer layers of the packaging materials without deformation of the electrically nonconductive layers, plus that these layers electrically isolate the working face of each electrically conductive layer employed in defining the working surface of the first seal jaw. The thickness of each of the electrically conductive layers is a function of the desired weld thickness and separation between welds.

The number of electrically conductive layers provided for the first seal jaw is dependent upon the number of seals which are desired to be produced. For example, in the longitudinal seal 22 of FIGS. 1 and 2, there is a single seal produced. For producing this single seal, it is required only that there be a single electrically conductive layer provided on the first seal jaw. For producing the double (two) transverse seals depicted in FIGS. 1 and 3, there are provided two electrically conductive layers which are separated by an electrically nonconductive layer. In either embodiment, however, there are provided electrically nonconductive layers outboard of (i.e., on opposite sides of) the electrically conductive layer or layers. This arrangement of the layers is of particular importance with respect to the outermost layers of the first seal jaw in that when these outermost layers, layers 50 and 50", for example, are electrically nonconductive, one can employ higher levels of RF electric energy without developing arcing between the seal jaws in the regions outside the seal area, but still within the region between the seal jaws. In the embodiment of the seal jaws depicted in FIG. 5, this reduction of the likelihood of arcing between the seal jaws is further enhanced by terminating the housing 42 short of the working surface 52 of the first seal jaw and by making the working surfaces 52 and 54 of the first and second seal jaws of equal areas and aligning these working surfaces in register with one another.

To ensure that the working surfaces 52 and 54 of the seal jaws develop a uniform electrical field and even mechanical contact pressure across the region of the packaging materials to be sealed, preferably, the working surfaces are fabricated to a flatness of at least 0.001 inch over their respective entire surfaces. Parallelism, over their respective lengths between the working surfaces during a sealing operation, of at least 0.001 inch, is maintained. A surface finish of about 120 microinches RMS, or finer, is preferred for each of the working surfaces of the two seal jaws. As desired, the second seal jaw 56 may be monolithic or may comprise layers of electrically conductive and nonconductive material.

With specific reference to FIG. 5, in accordance with the method of the present invention, the first and second seal jaws 40 and 56 are mounted for movement toward and away from one another by any of the several means 80 and 82 currently well known in the art. When the seal jaws are spaced apart from one another, layers 58 and 60 of packaging material are disposed between the seal jaws. Each layer 58 and 60 of packaging material includes a product contact layer 84 and 86, respectively, of a thermoplastic material, such as polyethylene. For sealing purposes, the thermoplastic layers of the two layers of packaging material are disposed in facing relationship. In a FFS machine, typically the layers 58 and 60 initially comprise a web which has been folded along its longitudinal centerline such that one side edge of the folded web is defined by the centerline fold and the other side edge is defined by the overlying unattached original side edges of the web. Typically, these overlying side edges are heat sealed to define a tube. When the web is folded, the side margins 84 and 86 of the thermoplastic layer of the web are contiguous and comprise the innermost layers of the folded material. These originally unattached side margins are typically compressed by contact pressure and heat sealed to define a tube. Similarly, a primary transverse seal is formed across the folded web perpendicular to the longitudinal seal to define a closed end tube. As forward movement of the tube progresses through the FFS machine, subsequent transverse seals are formed to define sealed packages. Forward movement of the tube through the FFS machine may be momentarily halted to permit the effectuation of transverse sealing of the filled tube or, in another embodiment, the seal jaw assembly may be moved in reciprocating unison with the forward movement of the tube. In either event, the time allowable for the completion of the transverse sealing is very short, e.g. less than 500 milliseconds. In this time period, the seal jaws are moved into engagement with the tube and apply contact pressure to the tube to expel product from between the layers of packaging material in the region thereof that is to be sealed, and to ensure good contact between the layers of the packaging material. Further, in this time period, sufficient RF electric energy is supplied to the seal jaws as will generate adequate heating of the facing polymer layers of the packaging materials to melt the polymer in the regions thereof between the faces of the electrically conductive layers of the first seal jaw and the working surface of the second seal jaw. Still further, the application of the RF electrical energy must be halted and the molten polymer cooled to its solidification temperature before releasing the application of the contact pressure to complete the entire sealing cycle. However, of this 500 millisecond overall cycle time, only 300 milliseconds is available to effect a weld. Shortening the length of time for effecting the sealing operation permits the FFS machine to be operated at a faster production speed, hence provides desirable cost savings. Employing the present invention, it has been found possible to improve the operational speed of a given FFS machine by as much as 20 to 30% and simultaneously achieve a uniform, continuous seal of the desired proportions.

What is claim:

1. Apparatus employing radio frequency electric energy for heat sealing overlying layers of a laminated packaging material that include respective contiguous layers of a heat sealable thermoplastic material disposed in facing relationship to one another, and at least one layer having a susceptibility to radio frequency electric energy sufficient to generate heat suitable to melt the thermoplastic material of the facing contiguous layers thereof comprising first and second seal jaws receiving therebetween the overlying layers of laminated packaging material, means for moving said first and second seal jaws toward and away from one another to selectively cause the working surfaces of the first and second seal jaws to engage the overlying layers of packaging material disposed therebetween and exert a preselected contact pressure against the overlying layers of packaging materials when the jaws are moved toward one another and release the pressure when the jaws are moved away from one another, said first seal jaw including a plurality of alternating layers of electrically conductive and electrically nonconductive materials defining a plurality of respective faces which cooperatively define a working surface of said first seal jaw suitable for engaging one surface of the overlying layers of packaging materials intended to be heat sealed, said electrically nonconductive layers being substantially incompressible at the contact pressure exerted by said seal jaws when moved toward one another, said second seal jaw being electrically conductive and having a working surface defined thereon which is oriented in facing relationship to an opposite surface of the overlying layers of laminated packaging materials disposed between said first and second seal jaws, a source of radio frequency electric energy, said electrically conductive layers and said second seal jaw being connected in an electrical circuit with said source of radio frequency electric energy to apply radio frequency electric energy across said circuit and transmission of said electric energy through the layers of packaging materials disposed between each electrically conductive layer of said first seal jaw and said second seal jaw at an energy level sufficient to effect melting of that volume of thermoplastic material disposed between the face of each layer of electrically conductive material of the first seal jaw and the working surface of the second seal jaw and thereby reduce the resistance to the contact pressure afforded by the thermoplastic materials in the melted volume thereof and permit the applied pressure to be assumed by the volume of packaging material disposed between each of the faces of the electrically nonconductive layers and the working surface of the second seal jaw to effect limited additional movement of said seal jaws toward one another upon the melting of the thermoplastic material.

2. The apparatus of claim 1 wherein each of said working surfaces of said first and second seal jaws is substantially planar and the respective planes thereof are oriented substantially parallel to one another.

3. The apparatus of claim 2 wherein said working surface of said first seal jaw is flat to within about 0.001 inch over its entire surface.

4. The apparatus of claim 1 wherein said working surface of said first seal jaw and said working surface of said second seal jaw each exhibit a surface finish of less than about 120 microinches RMS.

5. The apparatus of claim 1 wherein said first seal jaw comprises a single layer of electrically conductive material which is flanked on its opposite sides by layers of electrically nonconductive material.

6. The apparatus of claim 1 wherein said layers of electrically nonconductive material are fabricated from a material which is substantially incompressible when subjected to a pressure of about 300 psi over the area of its working face.

7. The apparatus of claim 1 wherein the respective length and width dimensions that determine the areas of the working surfaces of said first and second seal jaws are substantially equal.

8. The apparatus of claim 7 wherein the working surfaces of said first and second seal jaws are in register with one another.

9. The apparatus of claim 1 and including housing means for receiving and securing said electrically nonconductive layers of said first seal jaw in positions on the opposite sides of each layer of electrically conductive material of said first seal jaw.

10. A method for heat sealing overlying layers of a laminated packaging material that include respective contiguous layers of a heat sealable thermoplastic material disposed in facing relationship to one another, and at least one layer having a susceptibility to radio frequency electric energy sufficient to generate heat suitable to melt the thermoplastic material of the facing contiguous layers thereof comprising the steps of disposing the layers of laminated packaging material between first and second seal jaws having respective working surfaces with the thermoplastic material layers thereof in contiguous facing relationship to one another, said working surface of said first seal jaw being divided into discrete faces defined by alternating layers of electrically conductive and electrically nonconductive materials, moving said first and second seal jaws toward one another to apply a contact pressure to said layers of packaging material disposed therebetween, applying a radio frequency electric energy across said first and second seal jaws and the packaging materials disposed therebetween sufficient to develop adequate heat to melt the thermoplastic material of said layers of packaging materials in selected regions of said layers of packaging materials, while maintaining said contact pressure, limiting the extent of movement of said first and second jaws toward one another during the time period when said thermoplastic material is molten and incapable of resisting movement of said first and second jaws toward one another, to that degree of movement which effectively distributes said molten thermoplastic material throughout a desired seal volume without deleteriously reducing the thickness of the resultant seal, ceasing the application of radio frequency electric energy across said first and second seal jaws, after the molten thermoplastic has cooled to its solidification temperature, moving said first and second seal jaws away from one another to release said contact pressure from said packaging materials.

11. The method of claim 10 wherein said step of limiting the movement of said first and second seal jaws toward one another when the thermoplastic is molten includes assumption of said contact pressure by portions of that working surface of said first seal jaw acting through portions of said packaging materials which do not include molten thermoplastic material.

* * * * *